United States Patent [19]

Iwasaki

[11] Patent Number: 4,831,617
[45] Date of Patent: May 16, 1989

[54] DATA COMMUNICATION SYSTEM HAVING MEANS FOR SWITCHING BETWEEN MAIN AND STAND-BY APPARATUSES

[75] Inventor: Masaaki Iwasaki, Kawasaki, Japan

[73] Assignee: Fujitsu Limited, Kawasaki, Japan

[21] Appl. No.: 238,048

[22] Filed: Aug. 30, 1988

[30] Foreign Application Priority Data

Aug. 31, 1987 [JP] Japan .................... 62-215094

[51] Int. Cl.⁴ .................... H04J 1/16; H04J 3/14
[52] U.S. Cl. .................... 370/16; 370/13
[58] Field of Search .................... 370/13, 13.1, 16; 371/8; 379/4

[56] References Cited

U.S. PATENT DOCUMENTS

| | | | |
|---|---|---|---|
| 3,457,373 | 7/1969 | Duuren et al. | 370/16 |
| 4,412,323 | 10/1983 | Abbott et al. | 370/16 |
| 4,680,750 | 7/1987 | Davidow | 370/16 |

FOREIGN PATENT DOCUMENTS 56-84052 7/1981 Japan .

Primary Examiner—Robert L. Griffin
Assistant Examiner—Wellington Chin
Attorney, Agent, or Firm—Staas & Halsey

[57] ABSTRACT

A data communication system in which a pair of communication offices are provided in a 1:1 correspondence, each communication office including duplex constructed transmission-reception apparatuses, and a switching control unit for switching between the duplex constructed transmission-reception apparatuses in response an event to be switched the apparatuses, generated in an own communication office, and a change of the switching status in another communication office to match the switching status in the switching status the other in communication office so that a communication channel is established. The switching control units in the communication offices operate independently, but are provided with functions to prevent an endless mismatching of the switching between the communication offices, in a short time and by a simple procedure.

12 Claims, 8 Drawing Sheets

DATA COMMUNICATION SYSTEM HAVING MEANS FOR SWITCHING BETWEEN MAIN AND STAND-BY APPARATUSES

BACKGROUND OF THE INVENTION

1. Field of the Invention

The present invention relates to a data communication system, more particularly, to a data communication system in which two communication offices are provided in a 1:1 correspondence, and each office includes a main communication apparatus communicated with another main communication apparatus through a channel, a stand-by communication apparatus communicated with another stand-by communication apparatus through another channel, and a switching controller; the switching controllers in the both communication offices independently operating. Each switching controller switches between the main and stand-by communication apparatuses in its own communication apparatus in response to an event to be switched. In addition, each switching controller switches between the main and stand-by communication apparatuses in its own communication apparatus in response to a change of a switching status in another communication office.

2. Description of the Related Art

In a variety of data communication systems, to improve the reliability and availability, a redundant system configuration in which a main communication apparatus and a stand-by communication apparatus are provided, is extensively been adopted. In such data communication systems, a switching between the main communication apparatus and the stand-by communication apparatus is required, and a variety of switching methods are known. Note, the switching method depends upon the configuration of the data communication system.

In a data communication system in which a pair of communication offices are provided in a 1:1 correspondence, and each office includes a main communication apparatus communicated with another main communication apparatus through a channel, a stand-by communication apparatus communicated with another stand-by communication apparatus through another channel, a switching between the main communication apparatus and the standby communication apparatus is independently carried out at both of the communication offices. However, the prior art switching suffers from a long switching time, a complex procedure, etc., when difference in the switched statuses of the communication offices occur. The prior art switching for the above data communication system will be described later in more detail with reference to the drawings.

SUMMARY OF THE INVENTION

An object of the present invention is to provide a 1:1 correspondence type data communication system in which each switching control means in each communication office switches between main and stand-by communication apparatuses in response to an event to be switched in each own communication office independently to another switching control means connected through a channel, and in response to a switched status in the other communication office to match the statuses therebetween so that a new switched communication channel is established, and in which, in particular, the operation for eliminating difference switching statuses of two communication offices can be carried out in a short period and by a simple procedure, and can be realized by a simple circuit construction.

According to the present invention, there is provided a data communication system including: a first communication office having a first communication apparatus containing a first data transmission and reception circuit, a second communication apparatus containing a second data transmission and reception circuit having the same circuit configuration as the first data transmission and reception circuit, and a first switching unit; a second communication office having a second communication apparatus containing a third data transmission and reception circuit, a fourth communication apparatus containing a fourth data transmission and reception circuit having the same circuit configuration as the third data transmission and reception circuit, and a second switching unit; and at least two cables connecting the first and third communication apparatuses, and the second and fourth communication apparatuses. The first and second switching units are independently operated from each other. The first switching unit switches between the first and second communication apparatuses in response to an event to be switched in the first communication office, and the switched status in the second communication office to match the switching status therein with the switched status in the second communication office. The second switching unit switches between the third and fourth communication apparatuses in response to an event to be switched in the second communication office, and the switched status in the first communication office to match the switching status therein with the switched status in the first communication office. Each of the first and second switching units includes a switching control part, a first timer setting part for setting a first stabilizing time longer to be than a switching time, a second timer setting part for setting a second stabilizing time to be at least twice as long as the first stabilizing time, and a timer updating part for updating a timer to which the first or second stabilizing time is set. The switching control part switches between the communication apparatuses in its own communication office in response to an event in its own communication office and/or a change of the switching status in the other communication office, sets the first stabilizing time through the first timer setting part, and waits during the first stabilizing time. After the elapse of the first stabilizing time, the switching control part sets the second stabilizing time through the second timer setting part when an event to be switched in its own communication office and/or at the other communication office occurs, and waits during the second stabilizing time.

The first data transmission and reception circuit and the second data transmission and reception circuit are operatively connected to a first bus, which is provided in the first communication office and on which a main signal is transferred, at the side opposite to that at which the cables are connected thereto. The switching is carried out at the portion at which the first bus and the first data transmission and reception circuit or the second data transmission and reception circuit are operatively connected. Also, the third data transmission and reception circuit and the fourth data transmission and reception circuit are operatively connected to a second bus, which is provided in the second communication office and on which the main signal is transferred, at the side opposite to that at which the cables are connected thereto. The switching is carried out at the portion at which the second bus and the third data transmission and reception circuit or the fourth data transmission and reception circuit are operatively connected.

A first switching signal indicating the switched status in the first communication office is superimposed on the main signal and transferred to the third data transmission and reception circuit and/or the fourth data transmission and reception circuit by the first data transmission and reception circuit and/or the second data transmission and reception circuit, through the cables. Also, a second switching signal indicating the switched status in the second communication office is superimposed on the main signal and transferred to the first data transmission and reception circuit and/or the second data transmission and reception circuit by the third data transmission and reception circuit and/or the fourth data transmission and reception circuit, through the cables.

The first switching control part receives the second switching signal, compares the first and second switching signals, and switches between the first and second communication apparatuses to match the second switched status when the first and second switching signals do not coincide. Also, the second switching control part receives the first switching signal, compares the first and second switching signals, and switches between the first and second communication apparatuses to match the first switched status when the first and second switching signals do not coincide.

Each data transmission and reception circuit includes a data transmission circuit connected to a data transmission bus in the bus, and a data reception circuit independently operating of the data transmission circuit and connected to a data reception bus in the bus. The data transmission circuit includes a switch circuit to connect or disconnect the data transmission circuit and the data transmission bus. The data reception circuit includes a switch circuit to connect or disconnect the data reception circuit and the data reception bus.

Each data transmission circuit includes a data multiplexing circuit. Each data reception circuit includes a data demultiplexing circuit.

Each communication apparatus includes a sub-controller for transferring a switching signal form the switching control part to the switch circuits in the data transmission circuit and the data reception circuit, transferring the switching signal to be transmitted to the other communication office and from the switching control part to the data transmission circuit, and transferring the switching signal received at the data reception circuit transmitted from the other communication office to the switching control part.

The first to fourth communication apparatuses have a same circuit configuration.

BRIEF DESCRIPTION OF THE DRAWINGS

Other objects and features of the present invention will be described more in detail with reference to the accompanying drawings, in which.

DESCRIPTION OF THE PREFERRED EMBODIMENTS

Before describing the preferred embodiments of the present invention, a general system configuration of a data communication applied to the present invention and a general switching operation thereof will be described with reference to FIG. 1.

Figure 1:
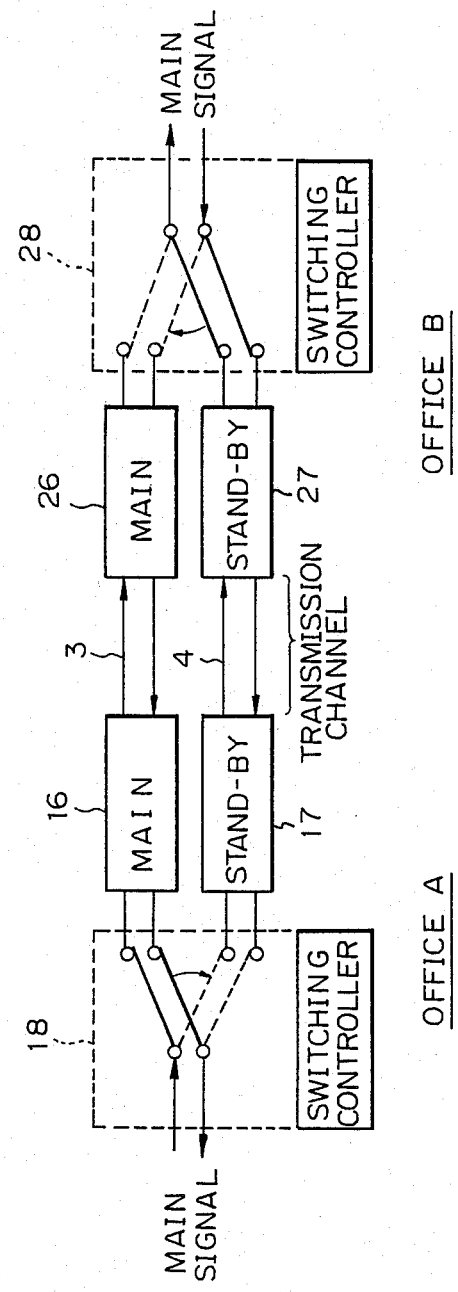
FIG. 1 is a block diagram of a general data communication system to which the present invention is applied.

Referring to FIG. 1, a data communication system includes a first communication office A, a second communication office B, and two transmission channels 3 and 4. The first communication office A comprises a main communication apparatus 16, a stand-by communication apparatus 17, and a switching controller 18. The second communication office B also comprises a main communication apparatus 26, a stand-by communication apparatus 27, and a switching controller 28. The main communication apparatuses 16 and 26 and the stand-by communication apparatuses 17 and 27 have the same circuit configuration. Each of these communication apparatuses includes a data transmission circuit and a data reception circuit. The switching controllers 18 and 28 also have the same circuit configuration. Each of these switching controllers 18 and 28 switches between the main and stand-by communication apparatuses in its own communication office when a problem, for example, a fault in the main communication apparatus, an increase of an error rate of transmission data, or a generation of switching at the other communication office, arises. For example, when the switching controller 18 detects a fault in the main communication apparatus 16, the switching controller 18 switches from the main communication apparatus 16, which is currently used, to the stand-by communication apparatus 17. Consequently, the main communication apparatus 26 in the opposite side communication office B can not receive data from the main communication apparatus 16, but the stand-by communication apparatus 27 can receive data from the stand-by communication apparatus 17 in the communication office A. The switching controller 28 detects this status, and switches from the main communication apparatus 26 to the stand-by communication apparatus 27 to establish a communication channel. Further, the switching controller 18 confirms the completion of the switching at the communication office B by detecting the switch to the stand-by communication apparatus 17, which can receive data from the stand-by communication apparatus 27 switched at the communication office B.

Since the switching between the communication apparatuses takes a relatively long time, for example, approximately 50 ms, and a direct communication between the switching controllers 18 and 28 is not taken into account, i.e., the switching controllers 18 and 28 operate independently from each other, a mismatch of the switching statuses of the communication apparatuses of the communication offices A and B may arise. The mismatch of the switching status occurs when a condition arises wherein, when the stand-by communication apparatus 27 is switched to become a currently use communication apparatus in the communication office B, the switching controller 18 switches back to the main communication apparatus 16 as the currently use apparatus when the stand-by communication apparatus 17 does not receive correct data from the stand-by communication apparatus 27 within a predetermined time from the switching to the stand-by communication apparatus 17, or vice versa. In this mismatched condition, the switching in the communication office A and the switching in the communication office B may continue endlessly even if both switching timings do not coincide.

Figure 2:
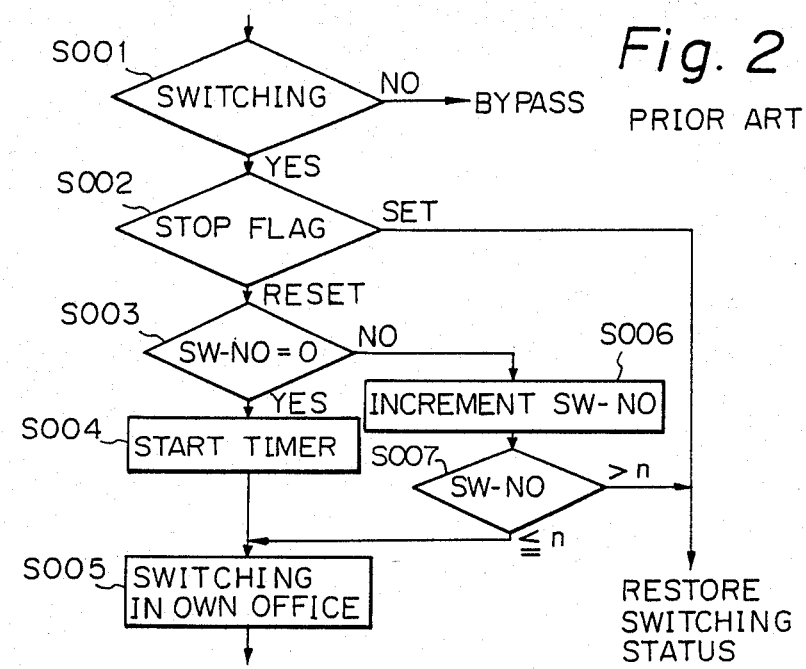
FIGS. 2 and 3 are flow charts explaining the switching operation of the prior art.
Figure 3:
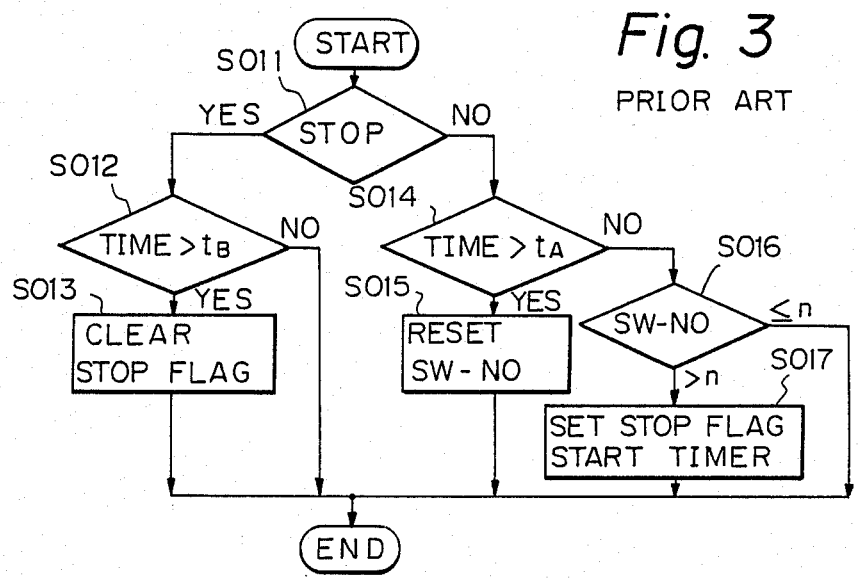

Referring to FIGS. 2 and 3, the switching operation of the prior art which avoids the above endless mismatched switching will be specifically described. In the prior art, the switching controllers are realized by computers, and thus the switching operation will be described with reference to flow charts. FIG. 2 shows a flow chart explaining the switching operation, and FIG. 3 shows a flow chart explaining the monitoring of a time for managing the switching operation.

Step 001 (S001) in FIG. 2

The switching controller, for example, 28, checks a generation of "a corresponding-switching" which means a switching between the communication apparatus 26 and 27 in response to the switching status of the other side communication apparatuses 16 and 17 in the communication office A, or vice versa. Namely, the corresponding-switching is not an own switching which is a switching based on an event to be switched and detected at it own communication office, such as a fault in the main communication apparatus in its own communication office, or a high error rate of the reception data.

In this case, the stand-by communication apparatus 17 is switched to become the currently use communication apparatus. When the switching is not necessary, the switching operation is naturally bypassed.

Step 002 (S002)

When the corresponding switching from the main communication apparatus 26 to the stand-by communication apparatus 17 occurs, the switching controller 28 checks a stop flag of the stand-by communication apparatus 17, which is a part of a memory of the computer, indicates a status to be switched when the stop flag is set and another status which is not to be switched when the stop flag is reset, and is set at step 017 (S017) or reset at step 013 (S013) shown in FIG. 3.

When the stop flag is reset, the following switching judgement and switching operation is carried out. On the other hand, when the stop flag is set, the operation for restoring the main communication apparatus 16 can be carried out.

Steps 003 to 007 (S003-S007)

The switching controller 18 checks a switching count number SW-NO which is initialized to zero and indicates the number of past switchings (S003). When the switching count number SW-NO is zero, namely a switching condition is in an initial state, the switching controller 18 starts a timer for monitoring the switching operation time (S004). Then, the switching controller 28 switches from the main communication apparatus 26 to the stand-by communication apparatus 27 to match the status of a vital communication apparatus therein with that of the communication office A (S005).

At step 003, when the switching count number SW-NO is not zero, that is, at least one of the switchings has been carried out, the switching controller 28 increases the switching count number SW-NO by one (S006), and checks whether or not the switching count number SW-NO exceeds a predetermined number n (S007). The number n is, for example, three (3). When the switching number SW-NO exceeds the predetermined number n, the switching controller 28 judges that the switching of the stand-by communication apparatus 27 has not been completed within predetermined times, and restores the main communication apparatus 26 to the currently use status. When the switching count number SW-NO does not exceed the predetermined number n, the switching controller 18 transfers the control to step 005, and the switching is repeated.

Steps 011, 014, 016 and 017 (S011, S014, S016, S017) in FIG. 3

When the stop flag is set (S011), the switching controller 18 checks the timer to detect whether a first time $t_A$ has elapsed (S014). The time $t_A$ is, for example, 10 minutes. When the timer shows that the time $t_A$ has not elapsed, the switching controller 18 checks the switching count number SW-NO to determine whether or not the switching count number SW-NO exceeds the predetermined number n (S016). When the switching count number SW-NO does not exceed the predetermined number n, the switching controller 28 does not carry out a further switching operation. When the switching count number SW-NO exceeds the predetermined number n, the switching controller 18 sets the stop flag and starts the timer (S017).

Steps 014 and 015 (S014, S015)

When the timer shows that the time $t_A$ has elapsed, the switching controller 18 resets the switching count number SW-NO to retry the switching.

Steps 011 to 013 (S011-S013)

When the switching of the stand-by communication apparatus 27 is stopped (S011), the switching controller 28 checks whether or not the timer shows that a second time $t_B$ has been exceeded (S012). The time $t_B$ is, for example, 60 minutes.

During the above switching operation, if the switched statuses of the communication offices A and B match, the switching is completed.

As described above, in the prior art, before the switching control in the communication office B, the switching controller 28 detects the switching condition by checking the past switching count number SW-NO and the elapsed time of the switching, and determines whether to stop the switching or to restart the switching after the elapse of the predetermined time.

In the communication office A, the switching controller 18 carries out the switching operation similar to the above.

In the computer for performing the above switching operation, in addition to other operations, various programs are operated in various modes. The above complex processing for switching the communication apparatuses lowers the performance of the a computer, and complex and a large programs for processing the above switching operation must be produced. Particularly, a long switching time for preventing an endless mismatching is required before a matching of the switching statuses of the communication offices A and B can be achieved.

To avoid the above drawbacks, a new approach, which utilizes a direct communication between the communication offices A and B, can be adopted. However, this approach requires a special communication system which includes a transmission and reception apparatus provided in the communication office A, such as the main communication apparatus 16, a transmission line, such as the transmission line 3, and another transmission and reception apparatus provided in the communication office B, such as the main communication apparatus 26, for communicating the switching status therebetween. Accordingly, the above new approach has not been adopted in practice.

Now, an embodiment of a data communication system in accordance with present invention will be described.

Figure 4:
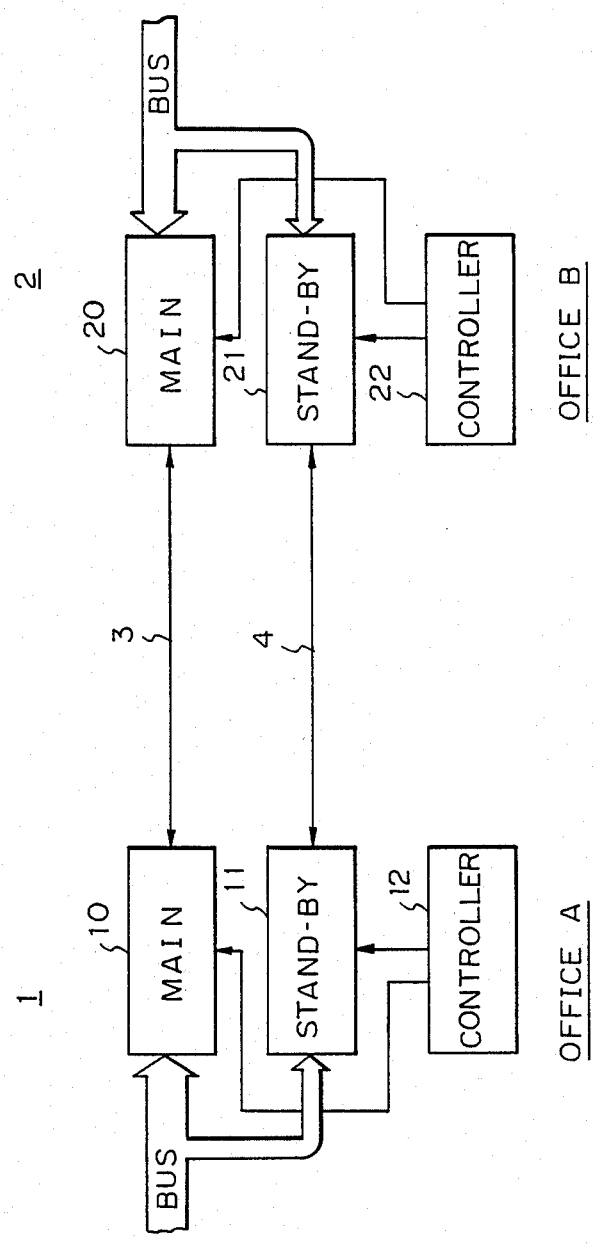
FIG. 4 is a block diagram of an optical data communication system of an embodiment in accordance with the present invention.

FIG. 4 shows a block diagram of an optical data communication system as an embodiment of the present invention. In the drawing, a first communication office A is provided with an optical main communication apparatus 10, which includes an optical transmission unit and an optical reception unit, and is connected to a bus, an optical stand-by communication apparatus 11, which includes another optical transmission unit having the same circuit configuration as that of the optical transmission unit in the main communication apparatus, and another optical reception unit also having the same circuit configuration as that in the main communication apparatus A, and is connected to the bus, and a controller 12 comprising a computer for controlling a switching in question and for processing a variety of operations in the communication system. A second communication office B has the same construction as that of the first communication office A. Optical transmission lines 3 and 4, specifically, optical fiber cables, are provided between the communication offices A and B. The first optical transmission line 3 connects the main communication apparatuses 10 and 20. The second optical transmission line 4 connects the stand-by communication apparatuses 11 and 21.

Figure 5:
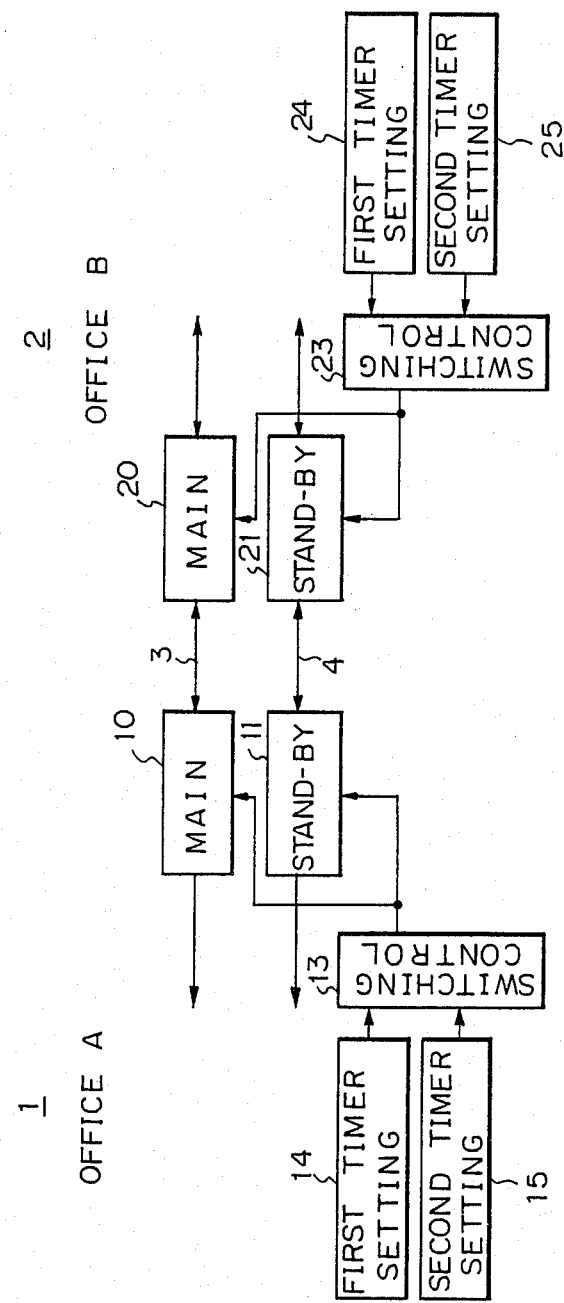
FIG. 5 is a diagram of the data communication system shown in FIG. 4 in which the switching means of the embodiment thereof are specifically shown.

FIG. 5 shows a diagram showing switching control portions 12a and 22a in the controlling 12 and 22 shown in FIG. 4. The first switching control portion 12a includes as switching control unit 13, a first timer setting unit 14, and a second timer setting unit 15. The switching control portion 13 performs all of the switching operations. The first timer setting unit 14 sets a first stabilizing time Ta to a timer. The second timer setting unit 15 sets a second stabilizing time Tb to the timer. As described above, the controller 12 is realized by a computer, the timer is a part in a memory of the computer and can be periodically updated when a new time is set thereto. The switching control unit 13, the first timer setting unit 14, and the second timer setting unit 15 are realized by programs stored in the memory and executed in a central processing unit (CPU).

The second control portion 22a has the same construction as that of the first switching control portion 12a.

Figure 6:
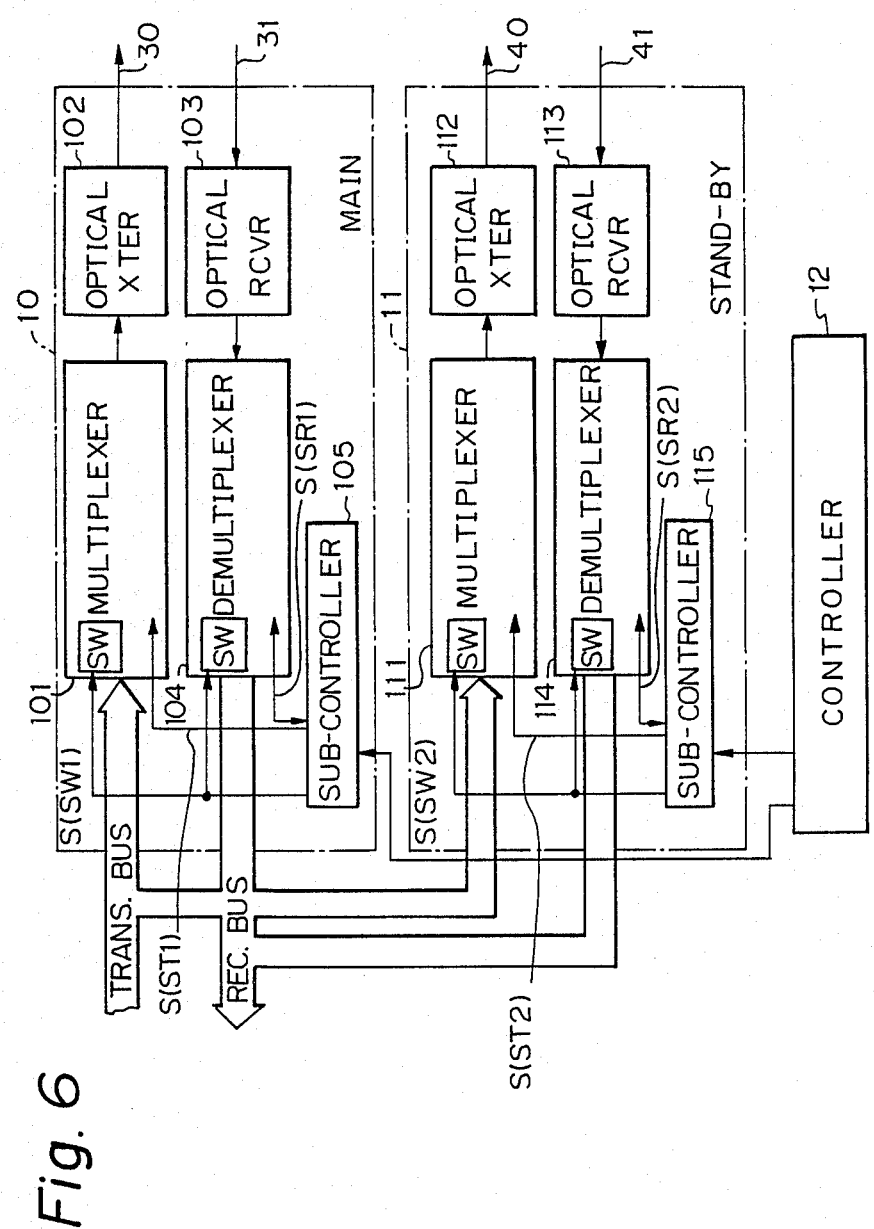
FIG. 6 is a circuit diagram of a main communication apparatus and a stand-by communication apparatus in a communication office shown in FIG. 5.

FIG. 6 shows a diagram of the optical main and stand-by communication apparatuses 10 and 11 in the first communication office A. The optical main and stand-by communication apparatuses 20 and 21 in the second communication office B have the same circuit construction as that of the first communication office A. The main communication apparatus 10 is composed of a multiplexer 101 having a switch circuit SW, an optical transmitter 102, an optical receiver 103, a demultiplexer 104 having another switch circuit SW, and a sub-controller 105. The optical transmission line 3 consists of two optical fiber cables 30 and 31, one of which is connected to the optical transmitter 102 and the other of which is connected to the optical receiver 103. The multiplexer 101 is connected to a transmission bus TRANS. BUS to receive data thereon, which may comprise control data and transmission data, carries out the multiplexing of the data in a predetermined manner, and outputs the multiplexed data to the optical transmitter 102. The optical transmitter 102 includes an electrical-to-optical signal converter (E/OC), converts the received multiplexed electrical signal to an optical signal, and transmits the E/O converted signal to an optical receiver in the second communication office B (not shown) through the optical fiber cable 30. The optical receiver 103 receives optical multiplexed data from an optical transmitter in the second communication office B (not shown) through the optical fiber cable 31, and converts the received optical data into electrical data by an optical-to-electrical signal converter (O/EC) provided therein. The demultiplexer 104 receives the O/E converted signal from the optical receiver 103, carries out the demultiplexing of the received multiplexed signal, and outputs the demultiplexed data to a reception bus REC. BUS. The sub-controller 105 functions as an serial interface, namely, the sub-controller 105 decodes a control signal from the controller 12 to extract a switch control signal S(SW1) supplied to the switch circuits SW in the multiplexer 101 and the demultiplexer 104 and a status transmission signal S(ST1) supplied to the multiplexer 101. The sub-controller 105 also transmits a status reception signal S(SR1) from the demultiplexer 104 to the controller 12.

The stand-by communication apparatus 11 is also provided with a multiplexer 111 having a switch circuit SW, an optical transmitter 112, an optical receiver 113, a demultiplexer 114 having another switch circuit SW, and a sub-controller 115. The optical transmission line 4 consists of two optical fiber cables 40 and 41, one of which is connected to the optical transmitter 112 and the other of which is connected to the optical receiver 113. These circuits 111 to 115 have the same circuit configuration as those of the circuits 101 to 115 in the main communication apparatus 10.

Upon receipt of the switching control signal S(SW1) from the sub-controller 105, the switch circuits SW in the multiplexer 101 and the demultiplexer 104 switch the multiplexer 101 and demultiplexer 104 to connect the transmission bus TRANS. BUS and the multiplexes 101, and the reception bus REC. BUS and the demultiplexer 104, so that the main signal can be transmitted between the main communication apparatuses 10 and 20 through the optical fiber cables 30 and 31. The switch circuits SW in the multiplexer 111 and the demultiplexer 114 function in the same way a the switch circuits SW in the main communication apparatus 10. But, the controller 12 does not simultaneously output switching control signals having a same switching status to the sub-controllers 105 and 115.

The status transmission signal S(ST1) indicates a status for switching the main communication apparatus 10 in the communication office A; the status reception signal S(SR1) indicates a status for switching the main communication apparatus 10 to the communication office B; the status transmission signal S(ST2) indicates a status for switching the stand-by communication apparatus 11 in the communication office A, and the status reception signal S(SR2) indicates a status for switching the stand-by communication apparatus 11 due to the communication office B. Note, these signals are superimposed on a main signal. A logical "1" of these signals indicates a working status in which the main signal is transferred through the corresponding circuit. When the status transmission signal S(ST1) is a logical "1", the main communication apparatus 10 is in the currently use state, and actually transfers the main signal. A logical "0" of these signals indicates a waiting state, i.e., a stand-by status.

In a normal switching operation, for example, when an abnormal state of the main communication apparatus 10, which is in the currently use status, is detected, the controller 12 inverts the state of the first status transmission signal S(ST1) from "1" to "0" and the state of the second status transmission signal S(ST2) from "0" to "1". The controller 12 also inverts the statuses of the switching signals S(SW1) and S(SW2) to bypass the main communication apparatus 10, and connect the stand-by communication apparatus 11 to the transmission bus TRANS. BUS and the reception bus REC. BUS. The switch circuits SW in the main communication apparatus 10 bypass the multiplexer 101 from the transmission bus TRANS. BUS and the demultiplexer 104 from the reception bus REC. BUS. Conversely, the switch circuits SW in the stand-by communication apparatus 11 are switched to connect between the multiplexer 111 and the transmission bus TRANS. BUS; and the demultiplexer 114 and the reception bus REC. BUS. The controller 22 in the communication office B receives the transmission signals S(ST1) and S(ST2) from the main communication apparatus 11 in the communication office A through the main communication apparatus 20 in the communication office B, just before the above switching, as status reception signals in the communication office B. The controller 22 outputs a switching signal to switch circuits SW in the main communication apparatus 20 to bypass the main communication apparatus 20, and another switching signal to switch circuits SW in the stand-by communication apparatus 21 to connect between the stand-by communication apparatus 21 and transmission and reception buses TRANS. BUS and REC. BUS in the communication office B, in response to the switching status of the communication office A. When the main communication apparatus 20 can not receive the above status reception signals due to a failure in the main communication apparatus 10 in the communication office A, the controller 22 provisionally judges that a failure in the main communication apparatus 20 has occurred, and carries out the switching operation to switch from the main communication apparatus 20 to the stand-by communication apparatus 21, as similar to that of the controller 12 described above, in the communication office B.

Normally, both switchings can be accomplished by one switching operation in both communication offices A and B. However, a mismatch of the switching statuses of the communication offices A and B may occur.

Figure 7:
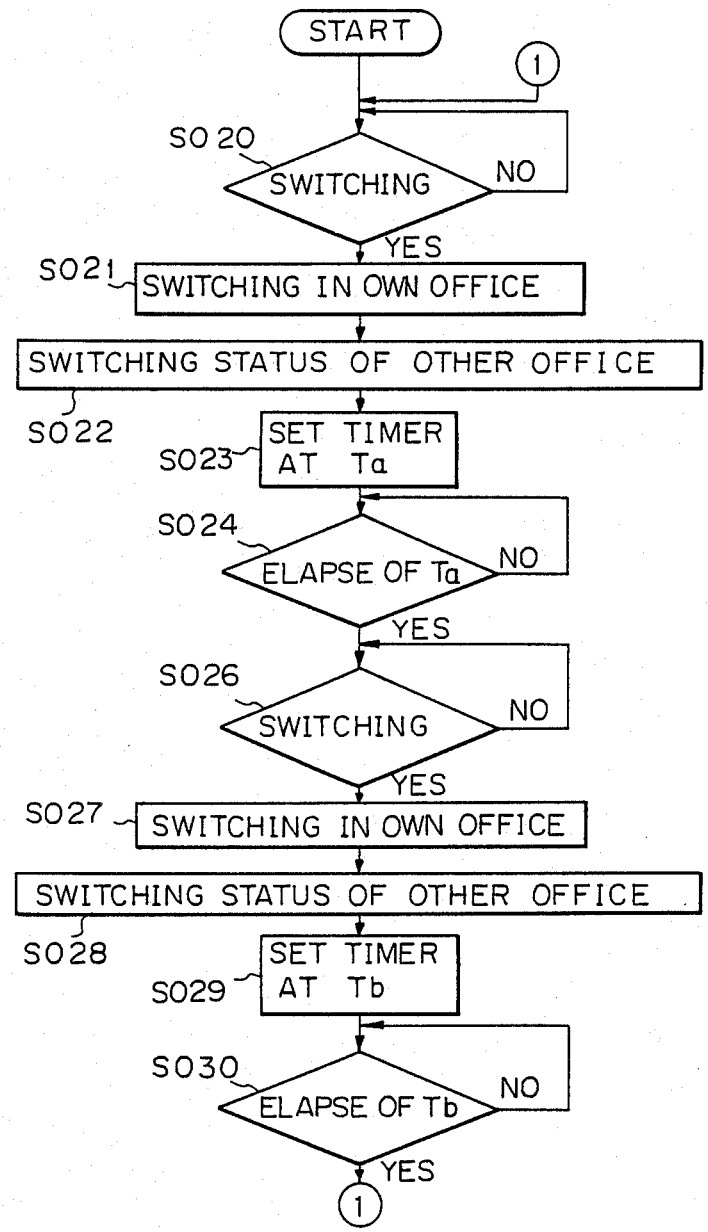
FIG. 7 is a flow chart explaining the operation of the data communication system shown in FIG. 5.

The switching operation of the switching controller 12a or 22a in FIG. 5, in which procedures for preventing the mismatch of the switching are included, will be described with reference to FIG. 7.

Step 020 (S020)

Assuming that the main communication apparatuses 10 and 20 are in the currently use state, the switching control portion 13 checks the generation of events to be switched from the main communication apparatus 10 to the stand-by communication apparatus 11. The switching events are an initial switching at a start-up of the data communication system, a fault in the main communication apparatus 10, an increase of the error rate of the reception data on the optical fiber cable 3, a compulsorily switching demand by an operator when maintenance is effected, and a switch from the main communication apparatus 20 to the stand-by communication apparatus 21 in the communication office B. As described above, the switch from the main communication apparatus 20 to the stand-by communication apparatus 21 in the communication office B can be detected by reading the status reception signals S(SR1) and/or S(SR2), or by detecting a no-response state at the main communication apparatus 20 during a predetermined time after the data transmission from the communication office A.

When no switching events are detected, the switching control portion 13 does not operate for the switching.

Step 021 (S021)

When a switching event is detected, the switching control portion 13 outputs the first switching control signal demanding a bypass to the sub-controller 105 in the main communication apparatus 10, and the second switching control signal demanding a connection to the sub-controller 115 in the stand-by communication apparatus 11. As a result, the switch circuits SW in the multiplexer 101 and the demultiplexer 104 switch to bypass the multiplexer 101 and the demultiplexer 104 from the transmission and reception buses TRANS. BUS and REC. BUS. Conversely, the switch circuits SW in the multiplexer 111 and the demultiplexer 114 switch to connect the multiplexer 111 and the demultiplexer 114 to the transmission and reception buses TRANS. BUS and REC. BUS.

Step 022 (S022)

The switching control portion 13 changes the status of the status transmission signals S(ST1) and S(ST2) which are transmitted to the communication office B through the optical transmitters 102 and 112, through the sub-controllers 105 and 115, respectively. Accordingly, the current switching status in the communication office A can be detected at the switching control portion 23 in the communication office B.

Steps 023 and 024 (S023, S024)

The switching control portion 13 sets the first stabilizing time Ta described above through the first timer setting portion 14. The first stabilizing time Ta is a waiting time during the transmission of the switching to the other communication office and the reception of a response thereto from the other communication office. The first stabilizing time Ta is 200 ms in this embodiment. The first stabilizing time Ta is longer than a time for switching the status in the communication office. The switching time is approximately 50 ms.

Subsequently, the switching control portion 13 waits for the elapse of the first stabilizing time Ta. In other words, the switching control portion 13 does not carry out any switching operations during the first stabilizing time Ta, to prevent vibrational switching between the communication offices A and B. The first stabilizing time Ta is periodically updated in a conventional manner.

By the above processing, the communication office A is set to a mode wherein the stand-by communication apparatus 11 is in the currently use status, and the stand-by communication apparatus 11 communicates with the opposite stand-by communication apparatus 21 through the optical fiber cables 40 and 41.

Step 026 (S026)

After the elapse of the first stabilizing time Ta, the switching control portion 13 detects the generation of any further events to be switched. The further events may be a new switching from the stand-by communication apparatus 21 to the main communication apparatus 20 in the communication office B, or a fault in the switched stand-by communication apparatus 11, etc.

When there are no further events, the switching control portion 13 does not carry out the switching operation.

Steps 027 and 028 (S027, S028)

When any event to be switched is detected, the switching control portion 13 outputs the first switching control signal demanding a connection to the sub-controller 105 in the main communication apparatus 10, and the second switching control signal demanding a bypass to the sub-controller 115 in the stand-by communication apparatus 11. As a result, the switch circuits SW in the multiplexer 101 and the demultiplexer 104 switch to connect the multiplexer 101 and the demultiplexer 104 to the transmission and reception buses TRANS. BUS and REC. BUS. Conversely, the switch circuits SW in the multiplexer 111 and the demultiplexer 114 switch to bypass the multiplexer 111 and the demultiplexer 114 from the transmission and reception buses TRANS. BUS and REC. BUS.

The switching control portion 13 changes the status of the status transmission signals S(ST1) and S(ST2) transmitted to the communication office B through the optical transmitters 102 and 112, through the sub-controller 105 and 115, respectively. Accordingly, the current switching status in the communication office A can be detected at the switching control portion 23 in the communication office B.

Steps 029 and 030 (S029, S30)

The switching control portion 13 sets the second stabilizing time Tb described above through the second timer setting portion 15. The second stabilizing time Tb is also a waiting time during the transmission of the switching to the other communication office and the reception of a response thereto from the other communication office. The second stabilizing time Tb is 500 ms in this embodiment. Note that the second stabilizing time Tb is at least twice as long or longer than the first stabilizing time Ta, i.e, Tb≧2Ta. This is necessary to prevent vibrational repetition of the switching between the communication offices A and B. Even if a mismatch of the switching statuses of the communication offices A and B occurs during the first stabilizing time or the second stabilizing time, the other switching control portion 23 can adjust the switching status during the second stabilizing time to that of the communication office A, since the switching status of the communication office A does not change during the second stabilizing time, and the switching control portion 23 can switch the status of the communication office B up to two times, to restore the status.

Subsequently, the switching control portion 13 waits for the elapse of the second stabilizing time Tb. In other words, the switching control portion 13 does not carry out any switching operations during the second stabilizing time Tb, to prevent vibrational switching between the communication offices A and B. The second stabilizing time Tb is also periodically updated in a conventional manner.

By the above processing, the communication office A is set a mode wherein the main communication apparatus 10 is in the currently use status, and the main communication apparatus 10 communicates with the opposite main communication apparatus 20 through the optical fiber cables 30 and 31.

The above switching operation is also carried out in the communication office B.

As described above, the normal switching is carried out. Even if a mismatch of the switching statuses between the communication offices A and B occurs, the discordance can be eliminated during the second stabilizing time Tb.

Figure 8:
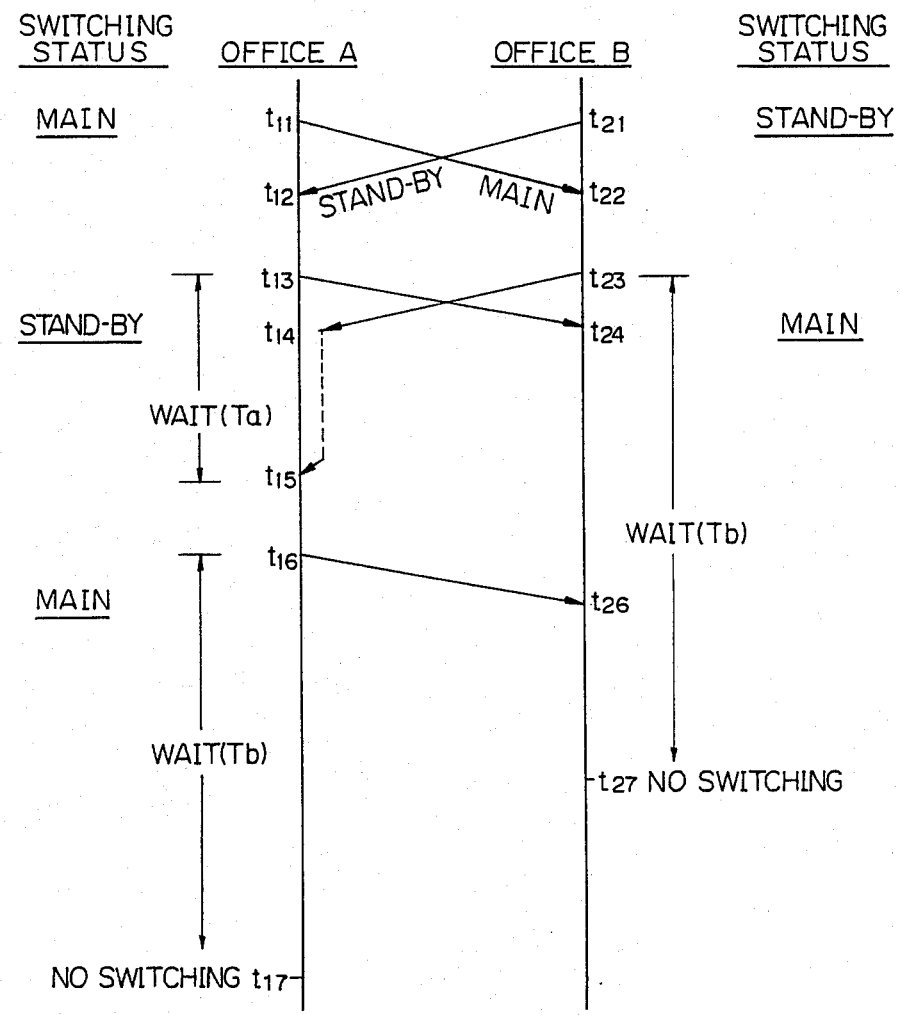
FIG. 8 is a view explaining a switching sequence of the data communication system shown in FIG. 5, and FIGS. 9a to 9d are views explaining switching modes of the data-communication system shown in FIG. 5.

FIG. 8 shows a time sequence of the switching operation.

At an initial time, the main communication apparatuses 10 and 20 are in the currently use state.

At a time t11, the main communication apparatus 10 sends the status transmission signals S(ST1) and S(ST2) to the communication office B.

Before a time t21 very close to the time t11, the switching control portion 23 detects an event to be switched from the main communication apparatus 20 to the stand-by communication apparatus 21, and switches the status in the communication office B to place the stand-by communication apparatus 21 in the currently use state. At the time t21, the switching control portion 23 sends the status transmission signals S(ST1) and S(ST2) to the communication office A. Thereafter, the switching control portion 23 waits for the first stabilizing time Ta. (See steps 020 to 024 (S020 to S024) in FIG. 7.)

At a time t22 after the elapse of the first stabilizing time Ta, the switching control portion 23 receives the status reception signals S(SR1) and S(SR2), which are the status transmission signals S(ST1) and S(ST2), from the communication office A. The switching control portion 23 again switches the status in the communication office B to place the main communication apparatus 20 in the currently use state to adjust the switching status to that of the communication office A in response to the status reception signals from the communication office A. At the time t23, the switching control portion 23 sends the status transmission signals S(ST1) and S(ST2) to the communication office A. Thereafter, the switching control portion 23 waits for the second stabilizing time Tb. (See above steps 026 to 030 (S026 to S030) in FIG. 7.)

At a time t12, the switching control portion 13 in the communication office A also receives the status reception signals S(SR1) and S(SR2), which are the status transmission signals S(ST1) and S(ST2) from the communication office B. At this time t12, the status reception signals S(SR1) and S(SR2) indicate that the stand-by communication apparatus 21 in the communication office B is in the currently use state. Accordingly, the switching control portion 13 switches the status in the communication office A to place the stand-by communication apparatus 11 in the currently use state. At the time t13, the switching control portion 13 sends the status transmission signals S(ST1) and S(ST2) to the communication office B. These transmission signals reach the communication office B at a time t24, but the transmission signals are ignored since the switching control portion 23 is waiting for the second stabilizing time Tb. Accordingly, the switching in the communication office B is not affected. Thereafter, the switching control portion 23 waits for the first stabilizing time Ta. (See steps 020 to 024 (S020 to S024) in FIG. 7.)

At a time t15 after the elapse of the first stabilizing time Ta, the switching control portion 13 receives the status reception signals S(SR1) and S(SR2), which are the status transmission signals S(ST1) and S(ST2) transmitted from the communication office A at the time t23 and received at the optical receivers in the communication office A at a time t14 before the time t15. The switching control portion 13 again switches the status in the communication office A to place the main communication apparatus 10 in the currently use state to adjust the switching status to that of the communication office B in response to the status reception signals from the communication office A. At a time t16, the switching control portion 23 sends the status transmission signals S(ST1) and S(ST2) to the communication office B. Thereafter, the switching control portion 23 waits for the second stabilizing time Tb. (See above steps 026 to 030 (S026 to S030) in FIG. 7.)

At a time t26, the communication office B receives the status transmission signals from the communication office A and issued at the time t16, but these status transmission signals are received at the switching control portion 23 at a time t27 after the elapse of the second stabilizing time Tb.

At a time t17 after the elapse of the second stabilizing time Tb, the switching statuses of the communication offices A and B are matched, and thus further switching operations are not carried out at this time.

Referring to FIGS. 9a to 9d, the switching operation of the switching control portions 12a and 22a will be again described briefly.

Figure 9A:
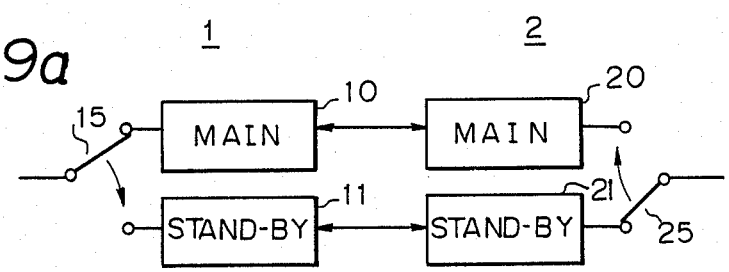

FIG. 9a shows a mismatch of the switching statuses of the communication offices A and B. For example, at an initial condition of the optical data communication system just after the data communication system was started up, the switching control unit 13 in the communication office A switches from the main communication apparatus 10 to the stand-by communication apparatus 11, while at almost the same time a little later than the above switching at the communication office A, the switching control unit 23 in the communication office B switches from the main communication apparatus 20 to the stand-by communication apparatus 21.

Figure 9B:
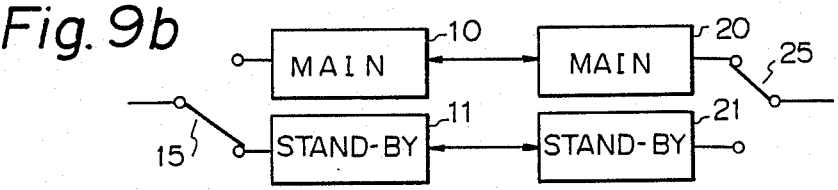

FIG. 9b shows the switched statuses in the communication offices A and B during the first stabilizing time Ta. During this time, the switching operation is not carried out in the communication offices A and B.

Figure 9C:
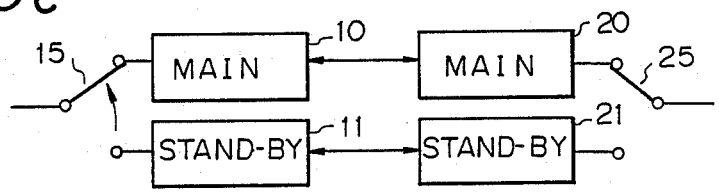

FIG. 9c shows the switching status in the communication office A. In the drawing, the switching control unit 13 switches from the stand-by communication apparatus 10 to the main communication apparatus 11 to match the switched status in the communication office B, after the elapse of the first stabilizing time Ta in the communication office A. The switching control unit 13 sends the switched status to the communication office B. Thereafter, the switching control unit 13 sets the second stabilizing time Tb through the second timer setting unit 15. In the communication office B, the first stabilizing time Ta therein elapses after the elapse of the first stabilizing time Ta in the communication office A, and after the switching in the communication office A. Since the switching control unit 23 receives the switches status in the communication office A, and the current switched status in the communication office B and the latest switched status in the communication office A are matched, the switching control unit 23 does not carry out the switching, and the operation thereof is terminated without setting the second stabilizing time Tb for the communication office B.

Figure 9D:
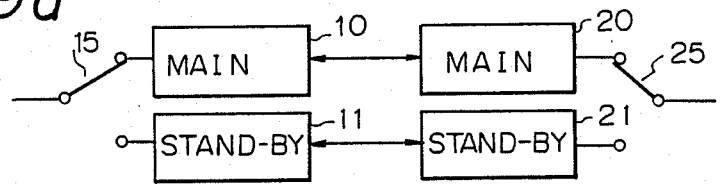

FIG. 9d shows the switched statuses of the communication-offices A and B during the second stabilizing time Tb in the communication office A. During this time, the switching control unit 13 does not carry out the switching operation. The switched statuses between the communication offices A and B are matched. After the elapse of the second stabilizing time Tb in the communication office A, the switching operation of the switching control unit 13 is also terminated.

As described above, the stabilizing times Ta and Tb are shorter than the times $t_A$ and $t_B$ in the prior art, respectively, and accordingly, a time during which the mismatching of the switching statuses is eliminated, becomes short. In addition, the switching algorithm of the present invention is simple, and accordingly, the production of the programs is easy, and a smaller size computer can be applied.

Many widely different embodiments of the present invention may be constructed without departing from the spirit and scope of the present invention. It should be understood that the present invention is not limited to the specific embodiments described in this specification, except as defined in the appended claims.

I claim:
1. A data communication system comprising:
a first communication office having a first communication apparatus including a first data transmission and reception circuit, a second communication apparatus including a second data transmission and reception circuit having the same circuit configuration as said first data transmission and reception circuit, and a first control means;
a second communication office having a third communication apparatus including a third data transmission and reception circuit, a fourth communication apparatus including a fourth data transmission and reception circuit having the same circuit configuration as said third data transmission and reception circuit, and a second control means; and
at least two cables connecting said first and third communication apparatuses, and said second and fourth communication apparatuses,
said first and second control means being operated independently from each other, said first control means switching between said first and second communication apparatuses in response to an event to be switched in said first communication office, and the switched status in said second communication office to match the switching status therein with the switched status in said second communication office, and said second control means switching between said third and fourth communication apparatuses in response to an event to be switched in said second communication office, and the switched status in said first communication office to match the switching status therein with the switched status in said first communication office, each of said first and second control means including a switching control means, a first timer setting means for setting a first stabilizing time to be longer than a switching time, a second timer setting means for setting a second stabilizing time to be at least twice as longer as said first stabilizing time, and a timer updating means for updating a timer to which said first or second stabilizing time is set, and each switching control means switching between said communication apparatuses in an own communication office in response to one of an event in said own communication office and a change of switching status in said other communication office, setting said first stabilizing time through said first timer setting means, waiting during said first stabilizing time, and after the elapse of said first stabilizing time, said switching control means setting said second stabilizing time through said second timer setting means when one of events to be switched in said communication office and from said other communication office occurs, and waiting during said second stabilizing time.

2. A data communication system according to claim 1, wherein said first data transmission and reception circuit and said second data transmission and reception circuit are operatively connected to a first bus, which is provided in said first communication office and on which a main signal is transferred, at a side opposite to that at which said cables are connected, and the switching is carried out at a portion at which said first bus and one of said first data transmission and reception circuit and said second data transmission and reception circuit are connected, and wherein said third data transmission and reception circuit and said fourth data transmission and reception circuit are operatively connected to a second bus, which is provided in said second communication office and on which the main signal is transferred, at a side opposite to that at which said cables are connected, and the switching is carried out at a portion at which said second bus and one of said third data transmission and reception circuit and said fourth data transmission and reception circuit are connected.

3. A data communication system according to claim 2, wherein a first switching signal indicating the switched status in said first communication office is superimposed on the main signal and transferred to one of said third data transmission and reception circuit and said fourth data transmission and reception circuit by one of said first data transmission and reception circuit and said second data transmission and reception circuit through said cables, and wherein a second switching signal indicating the switched status in said second communication office is superimposed on the main signal and transferred to one of said first data transmission and reception circuit and said second data transmission and reception circuit by one of said third data transmission and reception circuit and said fourth data transmission and reception circuit through said cables.

4. A data communication system according to claim 3, wherein said first switching control means receives the second switching signal, compares the first and second switching signals, and switches between said first and second communication apparatuses to match the second switched status when the first and second switching signals do not coincide, and wherein said switching control means receives the first switching signal, compares the first and second switching signals, and switches between said first and second communication apparatuses to match the first switches status when the first and second switching signals do not coincide.

5. A data communication system according to claim 4, wherein each data transmission and reception circuit includes a data transmission circuit connected to a data transmission bus in said bus, and a data reception circuit operating independently from said data transmission circuit and connected to a data reception bus in said bus, said data transmission circuit including a switch circuit for connecting or disconnecting said data transmission circuit and said data transmission bus, and said data reception circuit including a switch circuit for connecting or disconnecting said data reception circuit and said data reception bus.

6. A data communication system according to claim 5, wherein each data transmission circuit includes a data multiplexing circuit, and each data reception circuit includes a data demultiplexing circuit.

7. A data communication system according to claim 6, wherein each communication apparatus includes a sub-controller for transferring a switching signal from said switching control means to said switch circuits in said data transmission circuit and said data reception circuit, transferring the switching signal to be transmitted to the opposite communication office and from said switching control means to said data transmission circuit, and transferring the switching signal received at said data reception circuit transmitted from said other communication office to said switching control means.

8. A data communication system according to claim 7, wherein said first to fourth communication apparatuses have a same circuit configuration.

9. A data communication system according to claim 1, wherein said switching control means, said first timer setting means, said second timer setting means, and said timer updating means are formed by a single computer.

10. A data communication system according to claim 9, wherein said switching control means, said first timer setting means, said second timer setting means, and said timer updating means in said first and second communication apparatuses are formed by a single computer.

11. A data communication system according to claim 10, wherein said switching control means, said first timer setting means, said second timer setting means, and said timer updating means in said third and fourth communication apparatuses are formed by a single computer.

12. A data communication system according to claim 9, wherein said switching control means, said first timer setting means, said second timer setting means, and said timer updating means in said third and fourth communication apparatuses are formed by a single computer.

* * * * *